United States Patent
Yang et al.

(10) Patent No.: US 9,106,905 B2
(45) Date of Patent: Aug. 11, 2015

(54) LAYOUT METHOD OF SUB-PIXEL RENDERINGS

(75) Inventors: Hsueh-Yen Yang, Hsin-Chu (TW);
Shang-Chieh Chu, Hsin-Chu (TW);
Hong-Shen Lin, Hsin-Chu (TW)

(73) Assignee: AU Optronics Corp., Science-Based Industrial Park, Hsin-Chu (TW)

( * ) Notice: Subject to any disclaimer, the term of this patent is extended or adjusted under 35 U.S.C. 154(b) by 557 days.

(21) Appl. No.: 13/463,785

(22) Filed: May 3, 2012

(65) Prior Publication Data

US 2013/0021328 A1  Jan. 24, 2013

(30) Foreign Application Priority Data

Jul. 19, 2011  (TW) .............................. 100125432 A

(51) Int. Cl.
*G06T 15/00* (2011.01)
*H04N 13/04* (2006.01)
*H04N 13/00* (2006.01)

(52) U.S. Cl.
CPC ....... *H04N 13/0422* (2013.01); *H04N 13/0037* (2013.01); *G09G 2300/0443* (2013.01); *G09G 2300/0452* (2013.01); *G09G 2340/0457* (2013.01)

(58) Field of Classification Search
USPC ................................................ 345/603–605
See application file for complete search history.

(56) References Cited

U.S. PATENT DOCUMENTS

| 6,157,374 A * | 12/2000 | West et al. ..................... 345/539 |
| 7,876,350 B2 | 1/2011 | Shin |
| 2007/0109468 A1* | 5/2007 | Oku .............................. 349/110 |
| 2007/0152997 A1 | 7/2007 | Lee |
| 2008/0001536 A1* | 1/2008 | Tsai et al. ..................... 313/506 |
| 2009/0021534 A1* | 1/2009 | Tomizawa et al. ............ 345/690 |
| 2010/0118045 A1 | 5/2010 | Elliott |
| 2010/0141693 A1* | 6/2010 | Lee et al. ...................... 345/694 |
| 2011/0080473 A1* | 4/2011 | Lee ................................ 348/51 |

FOREIGN PATENT DOCUMENTS

| CN | 1187083 A | 7/1998 |
| CN | 1991439 A | 7/2007 |
| CN | 101093630 A | 12/2007 |

* cited by examiner

*Primary Examiner* — Sath V Perungavoor
*Assistant Examiner* — Janese Duley
(74) *Attorney, Agent, or Firm* — Winston Hsu; Scott Margo

(57) ABSTRACT

A layout method of sub-pixel renderings includes the following steps: providing an RGB pixel rendering, wherein each pixel of the RGB pixel rendering includes a plurality of sub-pixels, and the plurality of sub-pixels have different colors from each other; and when displaying a stereo image, dividing the RGB pixel rendering into a first sub-pixel rendering corresponding to a left-eye image and a second sub-pixel rendering corresponding to a right-eye image; wherein at least one of each row and each column of the first sub-pixel rendering includes R, G, and B sub-pixels, and at least one of each row and each column of the second sub-pixel rendering includes R, G, and B sub-pixels.

15 Claims, 16 Drawing Sheets

LAYOUT METHOD OF SUB-PIXEL RENDERINGS

BACKGROUND OF THE INVENTION

1. Field of the Invention

The present disclosure relates to a layout method of sub-pixel renderings, and more particularly, to a layout method for dividing a pixel rendering into a first sub-pixel rendering corresponding to a left-eye image and a second sub-pixel rendering corresponding to a right-eye image when displaying a stereo image.

2. Description of the Prior Art

In the prior art, when automatically generating a stereo image, a left-eye image and a right-eye image are displayed in liquid crystal layers in an interlaced format. As a result, the left eye of a viewer can only see the left-eye image and the right eye of the viewer can only see the right-eye image so as to generate a parallax effect which makes the viewer automatically sense a stereo image. This means, however, that a horizontal resolution (or a vertical resolution) of the stereo image which the viewer senses is only half of its original pixel rendering. In other words, to display a stereo image, two adjacent horizontal sub-pixels (or two adjacent vertical sub-pixels) are required, where one sub-pixel will be seen by the left eye and the other adjacent sub-pixel will be seen by the right eye. The horizontal/vertical resolution of a 3D display mode is therefore half of the horizontal/vertical resolution of a 2D display mode.

Please refer to FIG. 1, which is a diagram showing a conventional RGGB sub-pixel rendering 100. FIG. 1 includes sub-diagrams FIG. 1(a) and FIG. 1(b). As shown in FIG. 1(a), the conventional RGGB sub-pixel rendering 100 includes a plurality of first pixel groups P1, where each of the first pixel groups P1 includes four sub-pixels arranged in a second-order array. The four pixels of the first pixel group P1 are R, G, G, and B pixels. The RGGB sub-pixel rendering 100 can share adjacent sub-pixels to form a RGB color mixer in order to reduce the number of sub-pixels required per pixel unit area. The RGGB sub-pixel rendering 100 can then mix colors with adjacent sub-pixels in order to make virtual pixels a complementary color. Those skilled in the art will readily understand the above operation, and further description is therefore omitted here for brevity. What calls for special attention is that: when displaying a stereo image, each pixel located in each row can be divided into two sub-pixels to generate a left-eye image and a right-eye image, as shown in FIG. 1(b). The RGGB sub-pixel rendering 100 can be divided into the left-eye image and the right-eye image in an interlaced arrangement. In both the left-eye image and the right-eye image, however, a single row will lack certain colors, and thus a 3D image is unable to be implemented.

Hence, how to provide a layout method of sub-pixel renderings for reducing the amount of sub-pixels without decreasing resolution and using sub-pixel sharing to mix neighboring colors is an important topic in this field.

SUMMARY OF THE INVENTION

One of the objectives of the present invention is to provide a method for dividing a pixel rendering into a first sub-pixel rendering corresponding to a left-eye image and a second sub-pixel rendering corresponding to a right-eye image when displaying a stereo image, in order to improve image resolution and display quality.

According to one aspect of the present invention, an exemplary layout method of sub-pixel rendering is provided. The method includes the following steps: providing a pixel rendering, wherein each pixel of the pixel rendering includes a plurality of sub-pixels, and the plurality of sub-pixels have different colors from each other; and when displaying a stereo image, dividing the pixel rendering into a first sub-pixel rendering corresponding to a left-eye image and a second sub-pixel rendering corresponding to a right-eye image; wherein at least one of each row and each column of the first sub-pixel rendering comprises R, G, and B sub-pixels, and at least one of each row and each column of the second sub-pixel rendering comprises R, G, and B sub-pixels.

According to another aspect of the present invention, an exemplary layout method of sub-pixel rendering is provided. The method includes the following steps: providing a pixel rendering, wherein each pixel rendering comprises: a plurality of first pixel groups, wherein each one of the plurality of first pixel groups comprises four pixels arranged in a second-order array; and a plurality of second pixel groups, wherein each one of the plurality of second pixel groups comprises four pixels arranged in a second-order array; and sorting each one of the first pixel groups and each one of the second pixel groups in an interlaced arrangement, wherein the four pixels of each one of the first pixel groups and the four pixels of each one of the second pixel groups are presented upside down and in reverse.

According to another aspect of the present invention, an exemplary layout method of sub-pixel rendering is provided. The method includes the following steps: providing a pixel rendering, wherein each pixel of the pixel rendering includes a plurality of sub-pixels, and the plurality of sub-pixels have different colors from each other; and when displaying a stereo image, dividing the pixel rendering into a first sub-pixel rendering corresponding to a left-eye image and a second sub-pixel rendering corresponding to a right-eye image; wherein at least one of each odd row and each odd column of the first sub-pixel rendering comprises R, G, and B sub-pixels, and at least one of each even row and each even column of the second sub-pixel rendering comprises R, G, and B sub-pixels.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
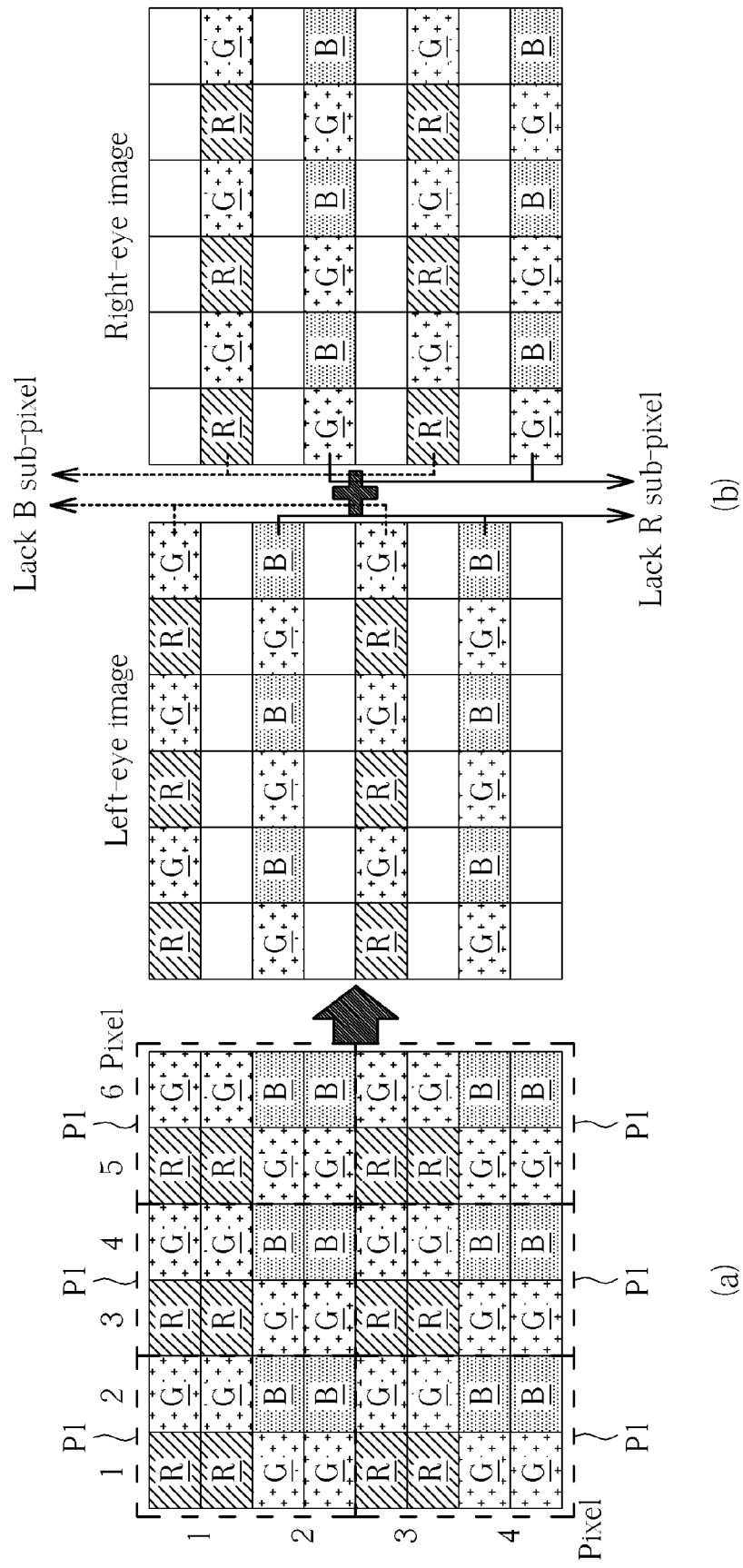
FIG. 1 (including sub-diagrams FIG. 1(a) and FIG. 1(b)) is a diagram showing a conventional RGGB sub-pixel rendering.
Figure 2:
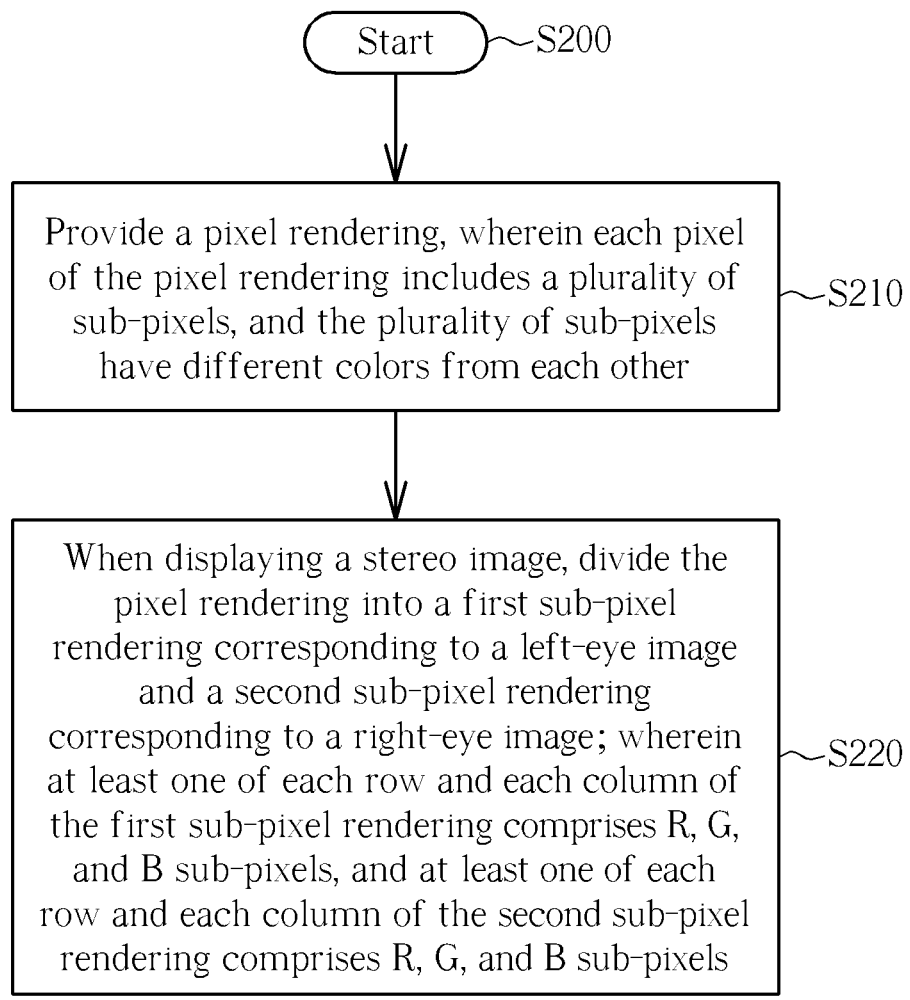
FIG. 2 is a flowchart illustrating a layout method of a sub-pixel rendering according to a first exemplary embodiment of the present invention.

Please refer to FIG. 2, which is a flowchart illustrating a layout method of a sub-pixel rendering according to a first exemplary embodiment of the present invention. The method includes, but is not limited to, the steps illustrated below. Please note that the following steps are not limited to be performed according to the exact sequence shown in FIG. 2 if a roughly identical result can be obtained.

Step S200: Start;

Step S210: Provide a pixel rendering, wherein each pixel of the pixel rendering includes a plurality of sub-pixels, and the plurality of sub-pixels have different colors from each other; and Step S220: When displaying a stereo image, divide the pixel rendering into a first sub-pixel rendering corresponding to a left-eye image and a second sub-pixel rendering corresponding to a right-eye image; wherein at least one of each row and each column of the first sub-pixel rendering comprises R, G, and B sub-pixels, and at least one of each row and each column of the second sub-pixel rendering comprises R, G, and B sub-pixels.

Figure 3:
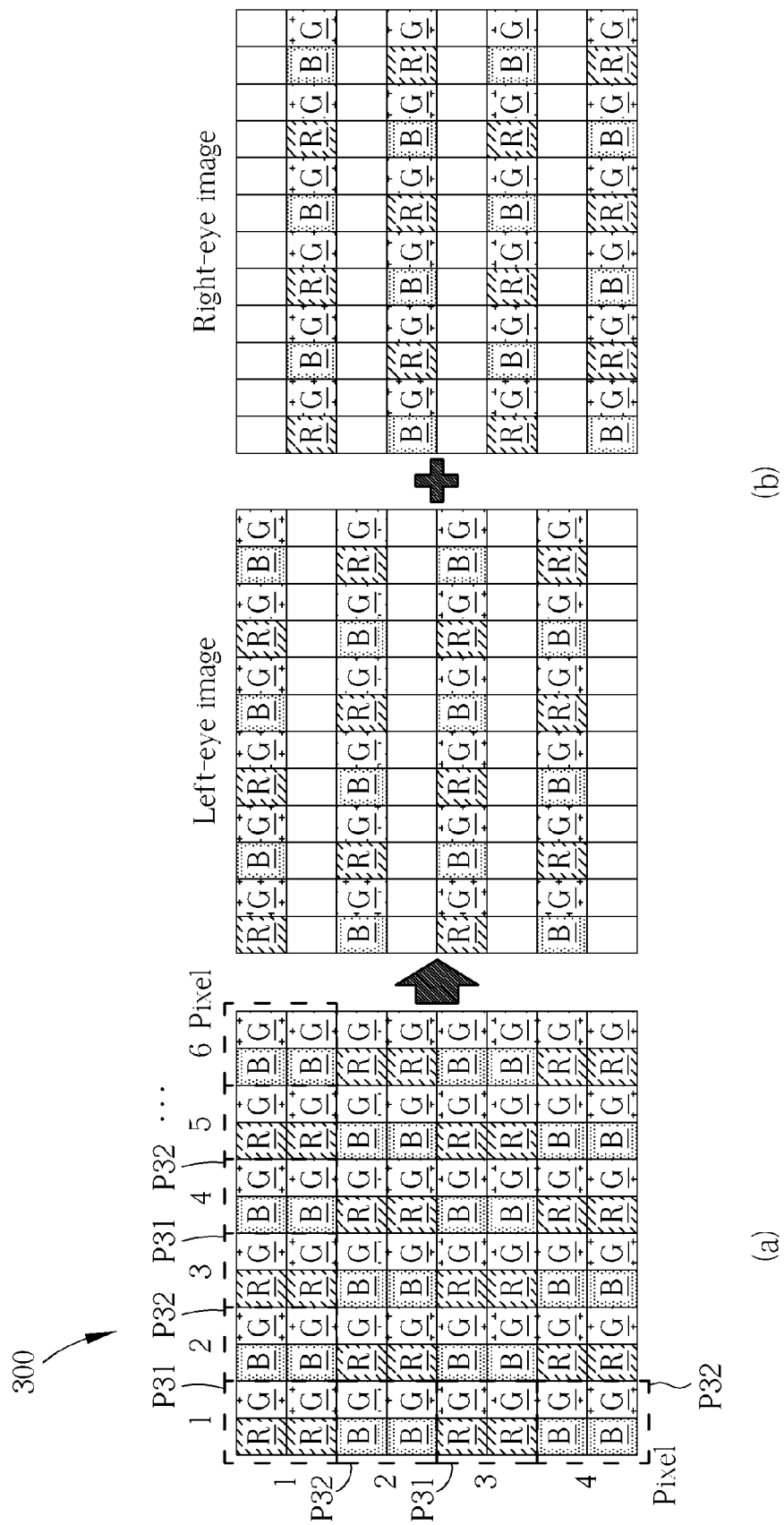
FIG. 3 (including sub-diagrams FIG. 3(a) and FIG. 3(b)) is a diagram showing a pixel rendering by using a layout method of a sub-pixel rendering according to a first embodiment of the present invention.

In the following paragraphs, the embodiments of FIG. 3 to FIG. 8 are used for illustrating the layout method of a sub-pixel rendering shown in FIG. 2. Please refer to FIG. 3, which is a diagram showing a pixel rendering 300 by using a layout method of a sub-pixel rendering according to a first embodiment of the present invention. FIG. 3 includes sub-diagrams FIG. 3(a) and FIG. 3(b). As shown in FIG. 3(a), each pixel of the pixel rendering 300 located in each row includes two sub-pixels. In addition, the pixel rendering 300 includes a plurality of first sub-pixel groups P31 and a plurality of second sub-pixel groups P32, wherein the first sub-pixel group P31 and the second sub-pixel group P32 are in an interlaced arrangement. For example, each row of each of the first sub-pixel groups P31 includes an R sub-pixel and a G sub-pixel, and each row of each of the second sub-pixel groups P32 includes a B sub-pixel and a G sub-pixel.

Please note that, as shown in FIG. 3(b), when displaying a stereo image, each pixel is divided into four sub-pixels in order to generate a first sub-pixel rendering as a left-eye image and a second sub-pixel rendering as a right-eye image. For example, each pixel located in each row only includes R and G sub-pixels or only includes B and G sub-pixels. Therefore, in this embodiment, adjacent sub-pixels can be shared to form a RGB color mixer, such that each pixel located in each row can make a complementary color. In addition, since each row of the pixel rendering includes R, G, and B sub-pixels, the problem that a single row lacks certain color(s) can be solved.

Figure 4:
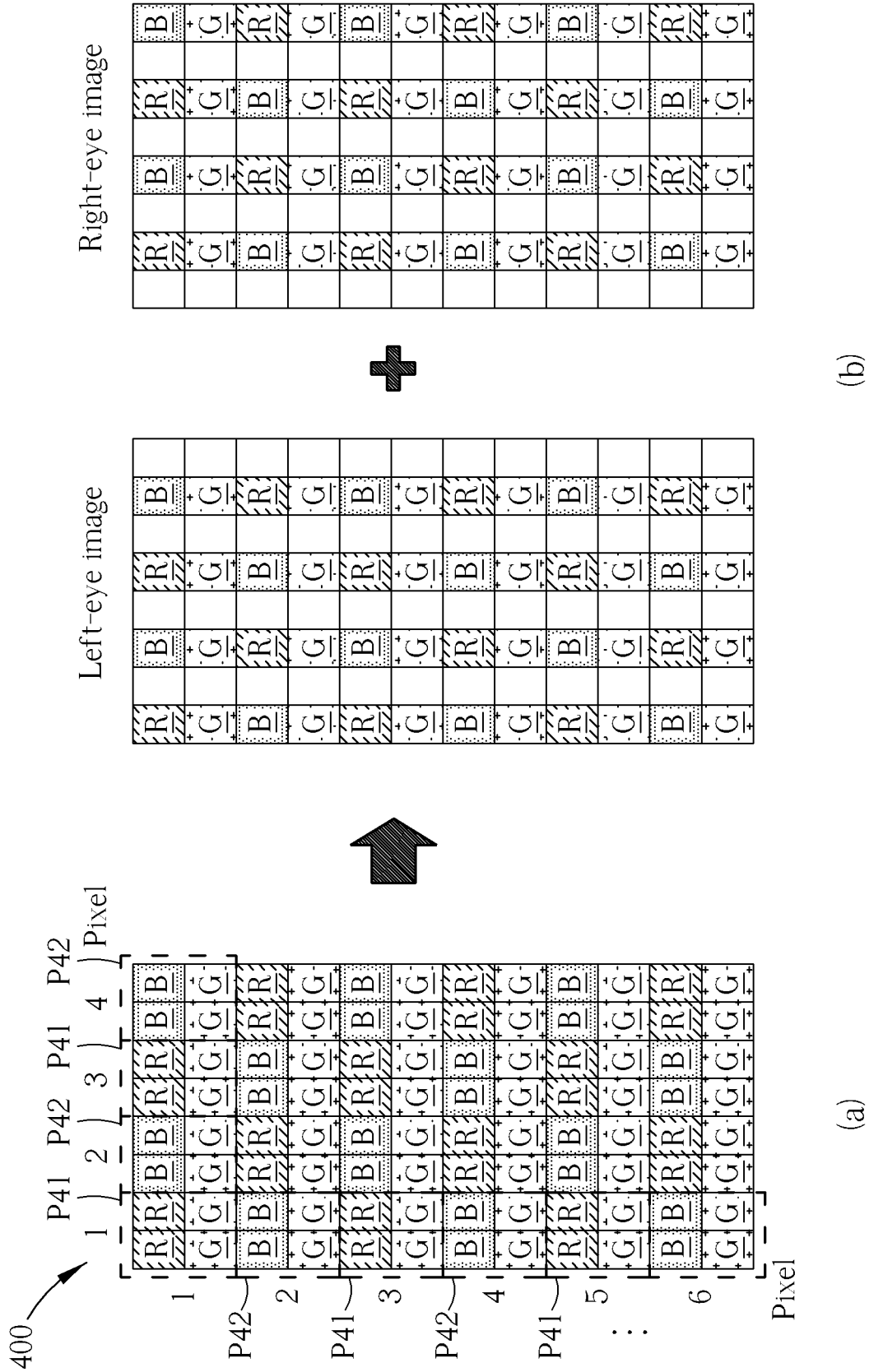
FIG. 4 (including sub-diagrams FIG. 4(a) and FIG. 4(b)) is a diagram showing a pixel rendering by using a layout method of a sub-pixel rendering according to a second embodiment of the present invention.

Please refer to FIG. 4. FIG. 4 (including sub-diagrams FIG. 4(a) and FIG. 4(b)) is a diagram showing a pixel rendering 400 by using a layout method of a sub-pixel rendering according to a second embodiment of the present invention. The architecture of the pixel rendering 400 shown in FIG. 4 is similar to that of the pixel rendering 300 shown in FIG. 3, The difference between them is that: in FIG. 3, the pixel rendering 300 is divided into a first sub-pixel rendering corresponding to a left-eye image and a second sub-pixel rendering corresponding to a right-eye image with a row-interlaced arrangement; in FIG. 4, the pixel rendering 400 is divided into a first sub-pixel rendering corresponding to a left-eye image and a second sub-pixel rendering corresponding to a right-eye image with a column-interlaced arrangement. Those skilled in the art can readily understand the arrangement rule of the pixel rendering 400 based on the description of the pixel rendering 300, and further description is omitted here for brevity.

Figure 5:
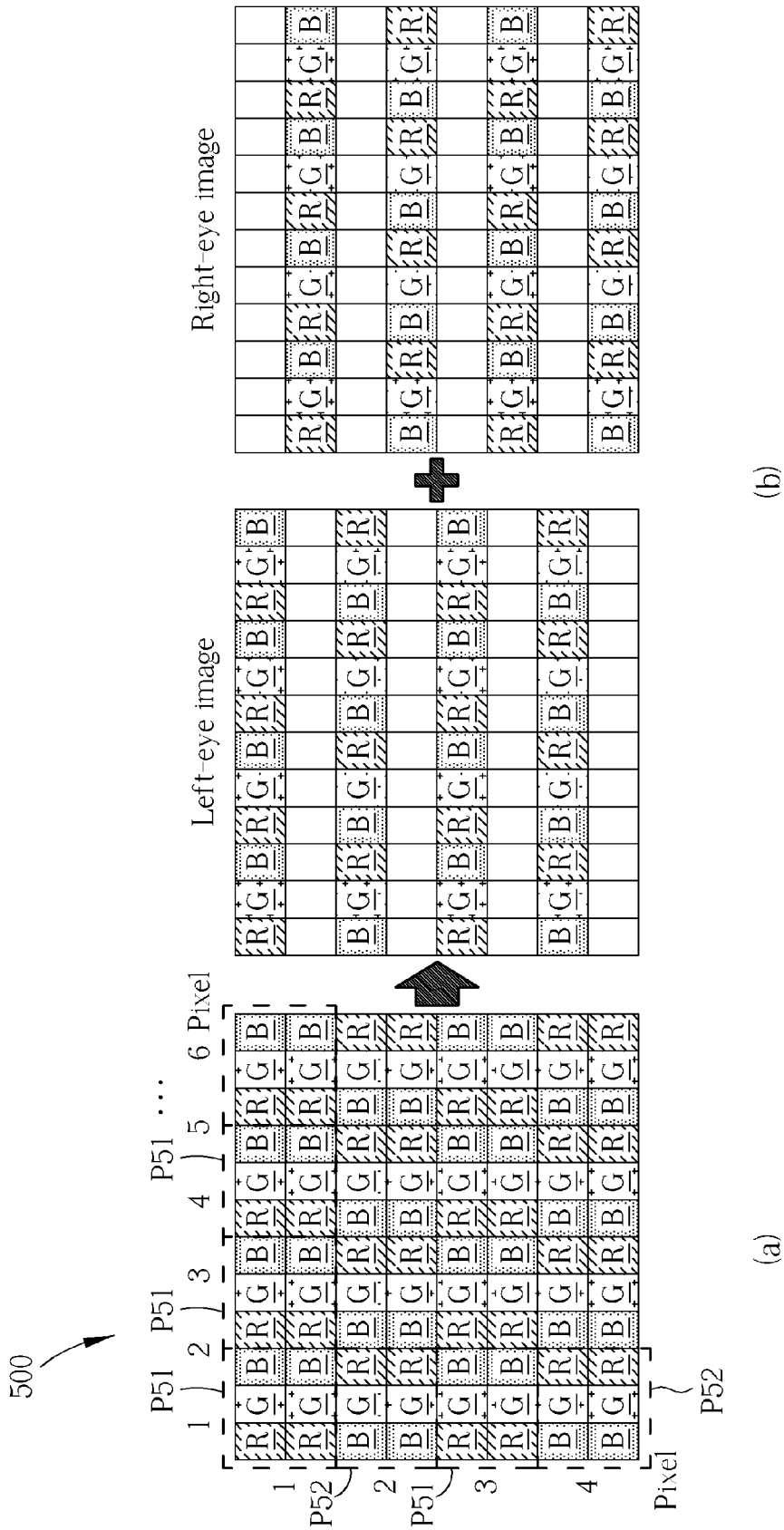
FIG. 5 (including sub-diagrams FIG. 5(a) and FIG. 5(b)) is a diagram showing a pixel rendering by using a layout method of a sub-pixel rendering according to a third embodiment of the present invention.

Please refer to FIG. 5, which is a diagram showing a pixel rendering 500 by using a layout method of a sub-pixel rendering according to a third embodiment of the present invention. FIG. 5 includes sub-diagrams FIG. 5(a) and FIG. 5(b). As shown in FIG. 5(a), each pixel of the pixel rendering 500 located in each row includes two sub-pixels. In addition, the pixel rendering 500 includes a plurality of first sub-pixel groups P51 and a plurality of second sub-pixel groups P52, wherein the first sub-pixel group P51 and the second sub-pixel group P52 are in an interlaced arrangement. For example, each row of each of the first sub-pixel groups P51 sequentially includes R, G, B, R, G and B sub-pixels, and each row of each of the second sub-pixel groups P52 sequentially includes B, G, R, B, G, and R sub-pixels.

Please note that, as shown in FIG. 5(*b*), when displaying a stereo image, each pixel is divided into four sub-pixels in order to generate a first sub-pixel rendering as a left-eye image and a second sub-pixel rendering as a right-eye image. For example, each pixel located in each row only includes two sub-pixels. Therefore, in this embodiment, adjacent sub-pixels can be shared to form a RGB color mixer, such that each pixel located in each row can make a complementary color. Hence, the problems that a single row lacks certain color(s) meaning a white light is unable to be mixed can be solved.

Figure 6:
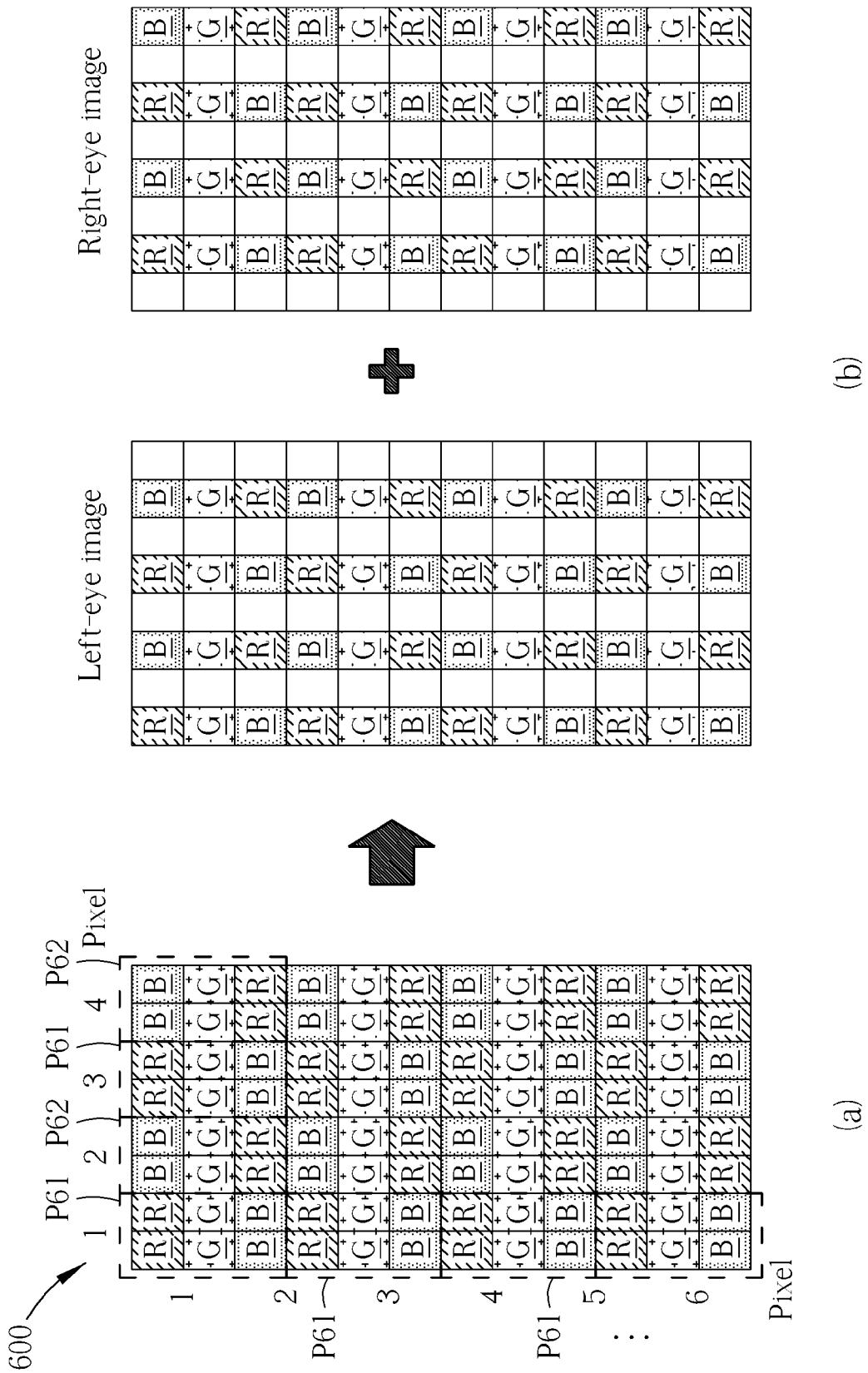
FIG. 6 (including sub-diagrams FIG. 6(a) and FIG. 6(b)) is a diagram showing a pixel rendering by using a layout method of a sub-pixel rendering according to a fourth embodiment of the present invention.

Please refer to FIG. 6. FIG. 6 (including sub-diagrams FIG. 6(*a*) and FIG. 6(*b*)) is a diagram showing a pixel rendering 600 by using a layout method of a sub-pixel rendering according to a fourth embodiment of the present invention. The architecture of the pixel rendering 600 shown in FIG. 6 is similar to that of the pixel rendering 500 shown in FIG. 5. The difference between them is that: in FIG. 5, the pixel rendering 500 is divided into a first sub-pixel rendering corresponding to a left-eye image and a second sub-pixel rendering corresponding to a right-eye image with a row-interlaced arrangement; in FIG. 6, the pixel rendering 600 is divided into a first sub-pixel rendering corresponding to a left-eye image and a second sub-pixel rendering corresponding to a right-eye image with a column-interlaced arrangement. Those skilled in the art can readily understand the arrangement rule of the pixel rendering 600 based on the description of the pixel rendering 500, and further description is omitted here for brevity.

Figure 7:
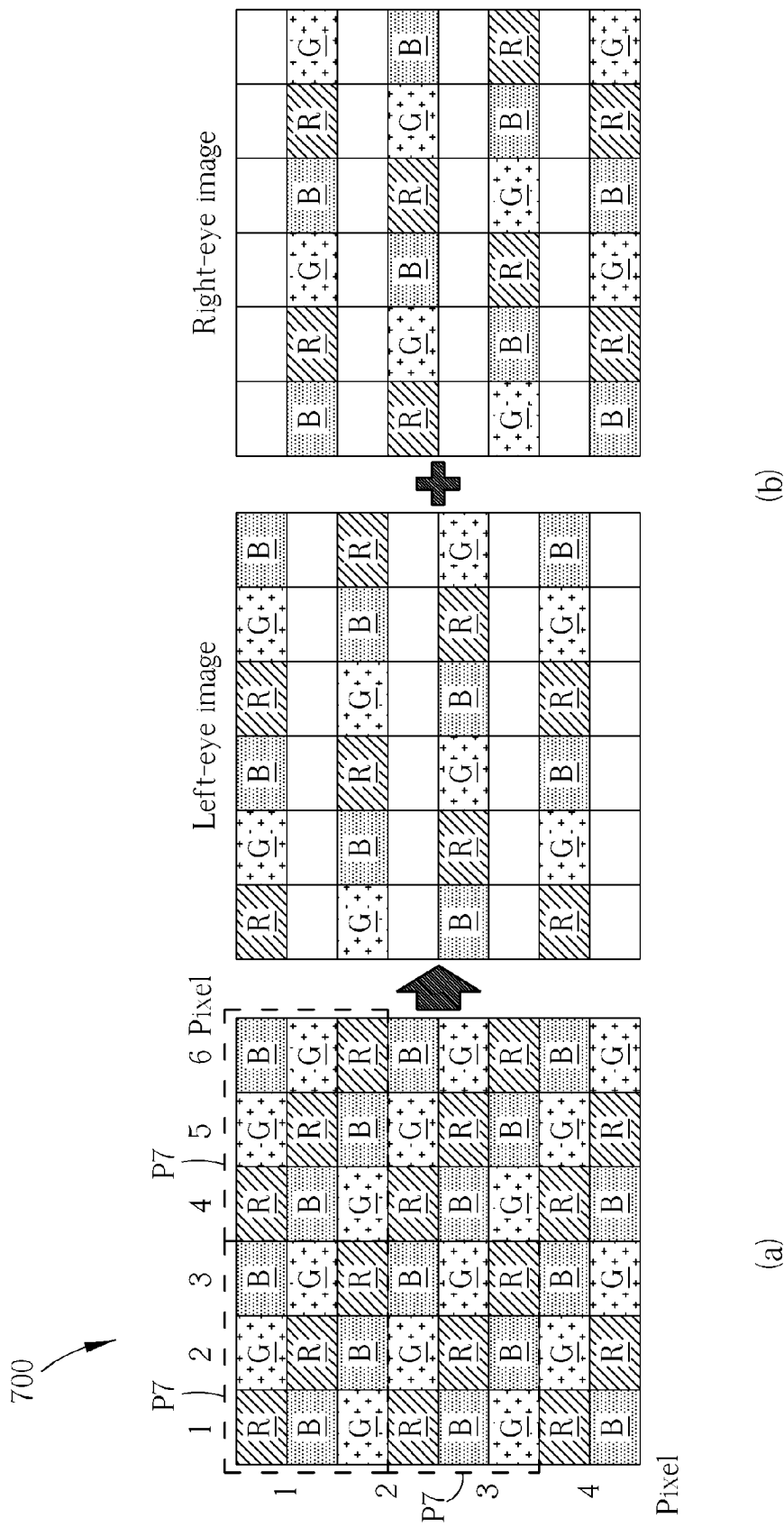
FIG. 7 (including sub-diagrams FIG. 7(a) and FIG. 7(b)) is a diagram showing a pixel rendering by using a layout method of a sub-pixel rendering according to a fifth embodiment of the present invention.

Please refer to FIG. 7, which is a diagram showing a pixel rendering 700 by using a layout method of a sub-pixel rendering according to a fifth embodiment of the present invention. FIG. 7 includes sub-diagrams FIG. 7(*a*) and FIG. 7(*b*). As shown in FIG. 7(*a*), each pixel of the pixel rendering 700 located in each row includes two sub-pixels. In addition, the pixel rendering 700 includes a plurality of sub-pixel groups P7, wherein each of the sub-pixel groups P7 includes nine sub-pixels arranged in a third-order array, each row of the third-order array includes R, G, and B sub-pixels, and each column of the third-order array comprises R, G and B sub-pixels.

Please note that, as shown in FIG. 7(*b*), when displaying a stereo image, each pixel is divided into two sub-pixels in order to generate a first sub-pixel rendering as a left-eye image and a second sub-pixel rendering as a right-eye image. For example, each pixel located in each row only includes two sub-pixels. Therefore, in this embodiment, adjacent sub-pixels can be shared to form a RGB color mixer, such that each pixel located in each row can make a complementary color. Hence, the problems that a single row lacks certain color(s) meaning a white light is unable to be mixed can be solved.

Figure 8:
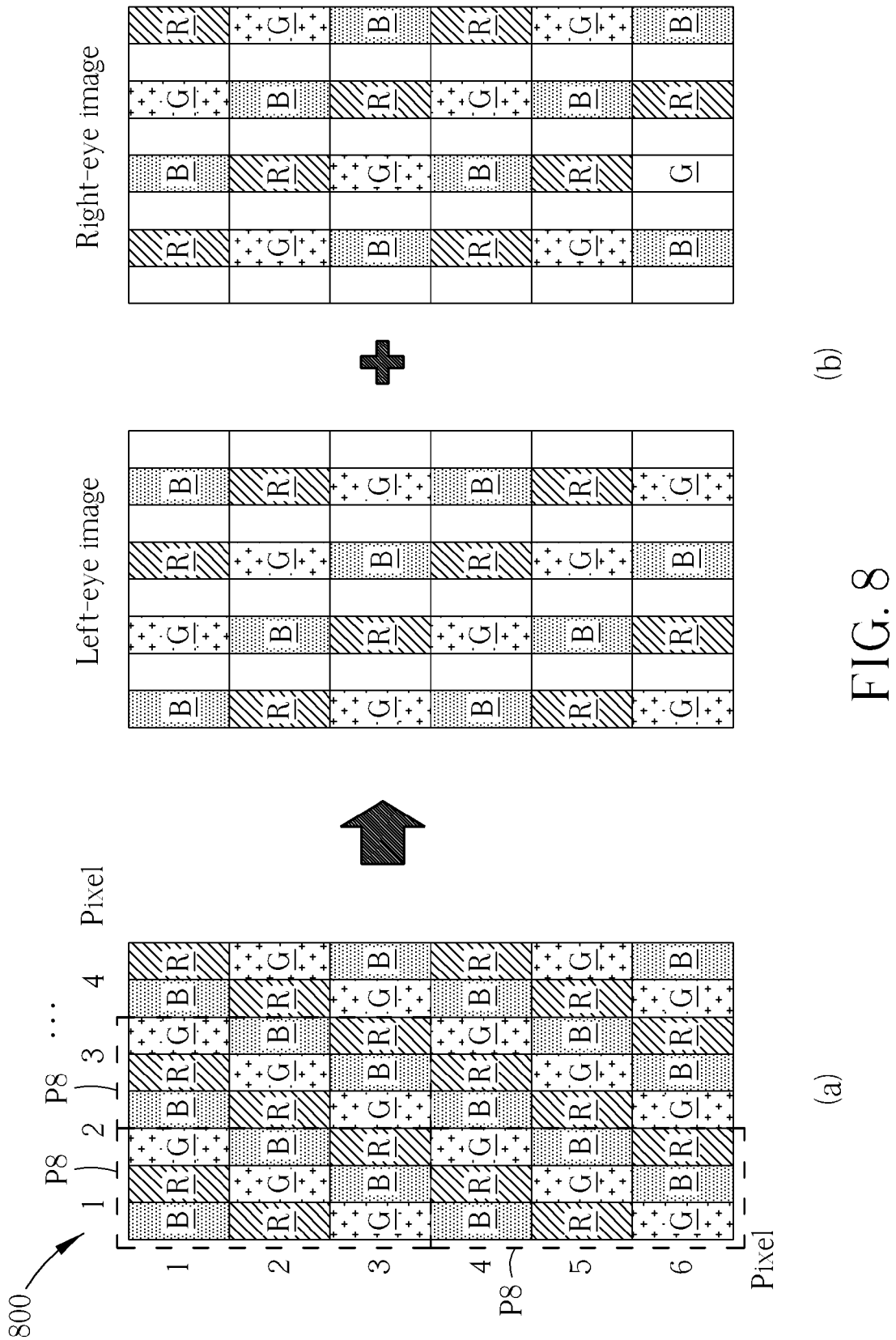
FIG. 8 (including sub-diagrams FIG. 8(a) and FIG. 8(b)) is a diagram showing a pixel rendering by using a layout method of a sub-pixel rendering according to a sixth embodiment of the present invention.

Please refer to FIG. 8. FIG. 8 (including sub-diagrams FIG. 8(*a*) and FIG. 8(*b*)) is a diagram showing a pixel rendering 800 by using a layout method of a sub-pixel rendering according to a sixth embodiment of the present invention. The architecture of the pixel rendering 800 shown in FIG. 8 is similar to that of the pixel rendering 700 shown in FIG. 7. The difference between them is that: in FIG. 7, the pixel rendering 700 is divided into a first sub-pixel rendering corresponding to a left-eye image and a second sub-pixel rendering corresponding to a right-eye image with a row-interlaced arrangement; in FIG. 8, the pixel rendering 800 is divided into a first sub-pixel rendering corresponding to a left-eye image and a second sub-pixel rendering corresponding to a right-eye image with a column-interlaced arrangement. Those skilled in the art can readily understand the arrangement rule of the pixel rendering 800 based on the description of the pixel rendering 700, and further description is omitted here for brevity.

Figure 9:
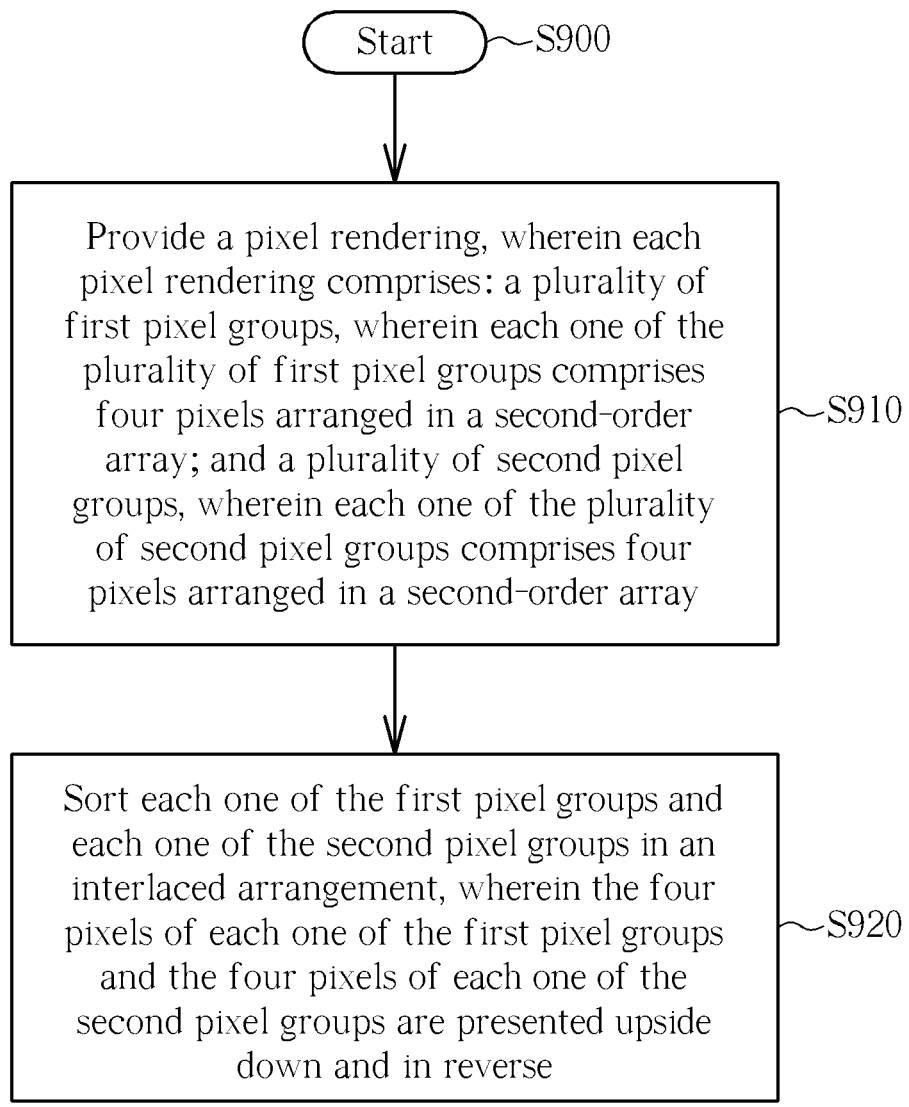
FIG. 9 is a flowchart illustrating a layout method of a sub-pixel rendering according to an exemplary embodiment of the present invention.

Please refer to FIG. 9, which is a flowchart illustrating a layout method of a sub-pixel rendering according to an exemplary embodiment of the present invention. The method includes, but is not limited to, the steps illustrated below. Please note that the following steps are not limited to be performed according to the exact sequence shown in FIG. 9 if a roughly identical result can be obtained.

Step S900: Start;

Step S910: Provide a pixel rendering, wherein each pixel rendering comprises: a plurality of first pixel groups, wherein each one of the plurality of first pixel groups comprises four pixels arranged in a second-order array; and a plurality of second pixel groups, wherein each one of the plurality of second pixel groups comprises four pixels arranged in a second-order array; and Step S920: Sort each of the first pixel groups and each of the second pixel groups in an interlaced arrangement, wherein the four pixels of each of the first pixel groups and the four pixels of each of the second pixel groups are presented upside down and in reverse.

Figure 10:
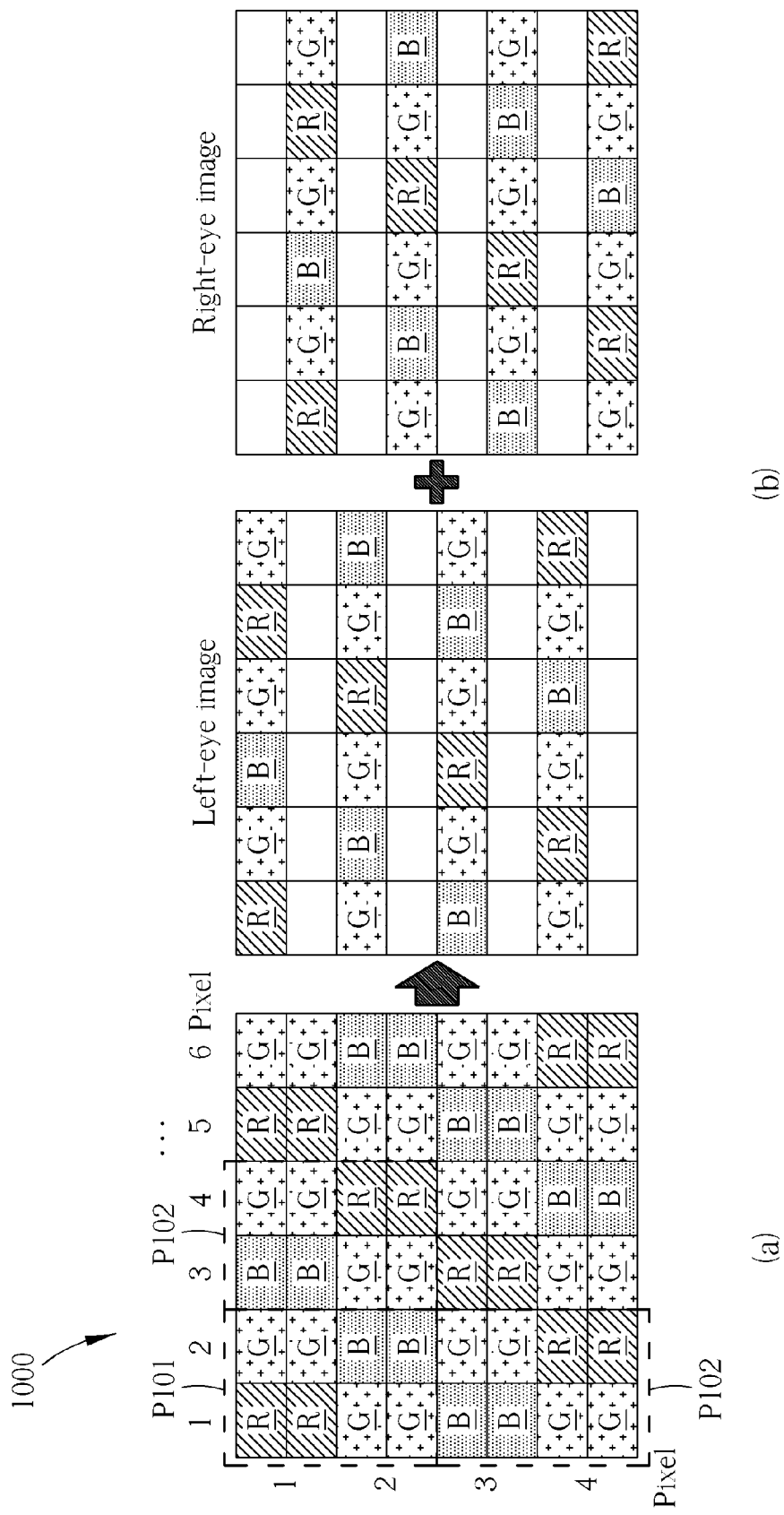
FIG. 10 (including sub-diagrams FIG. 10(a) and FIG. 10(b)) is a diagram showing a pixel rendering by using a layout method of a sub-pixel rendering according to a seventh embodiment of the present invention.
Figure 11:
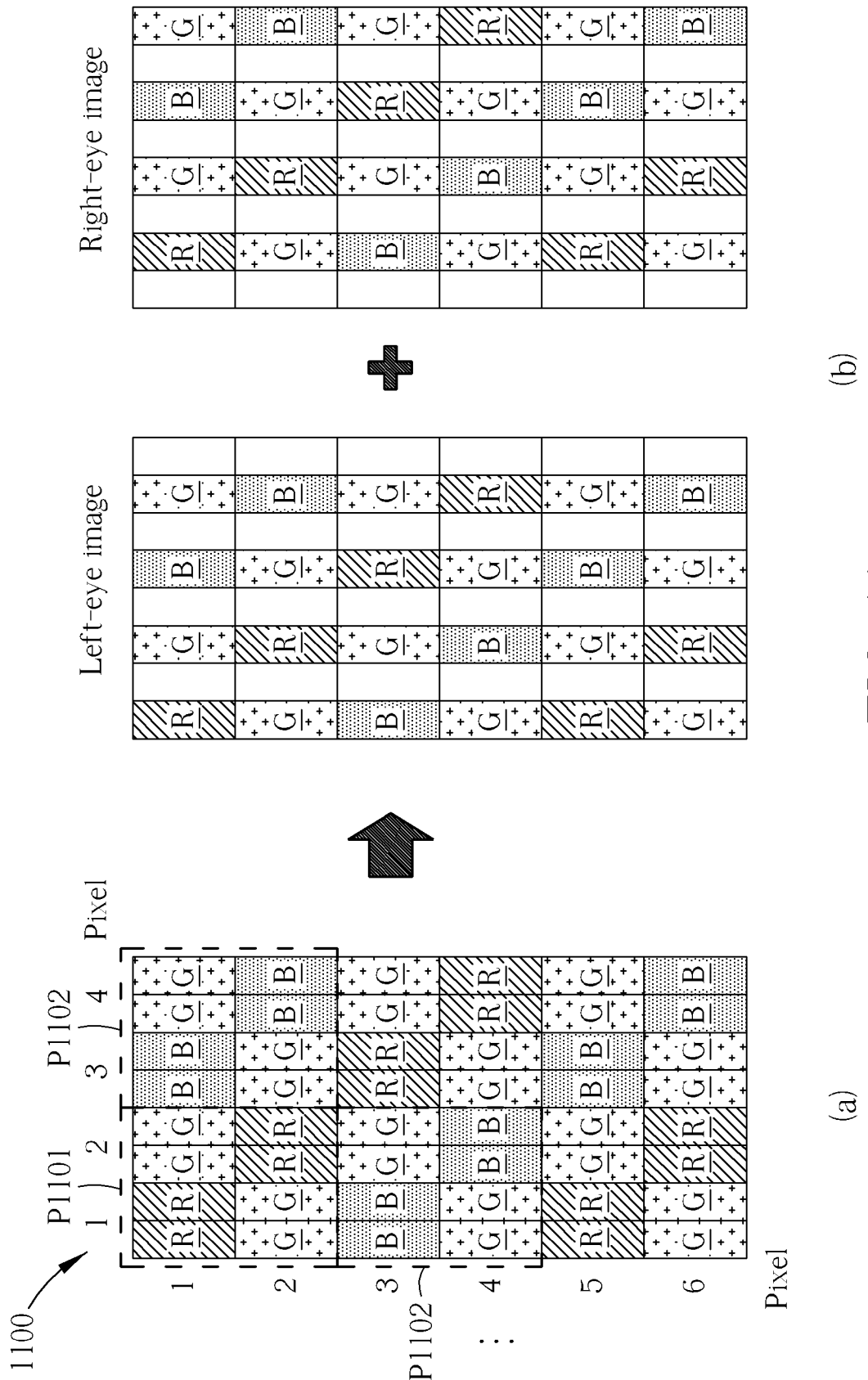
FIG. 11 (including sub-diagrams FIG. 11(a) and FIG. 11(b)) is a diagram showing a pixel rendering by using a layout method of a sub-pixel rendering according to an eighth embodiment of the present invention.

In the following paragraphs, the embodiments of FIG. 10 to FIG. 11 are used for illustrating the layout method of a sub-pixel rendering shown in FIG. 9. Please refer to FIG. 10, which is a diagram showing a pixel rendering 1000 by using a layout method of a sub-pixel rendering according to a seventh embodiment of the present invention. FIG. 10 includes sub-diagrams FIG. 10(*a*) and FIG. 10(*b*). As shown in FIG. 10(*a*), the pixel rendering 1000 includes a plurality of first sub-pixel groups P101 and a plurality of sub-pixel groups P102, wherein each of the first sub-pixel groups P101 includes four pixels arranged in a second-order array, such as R, G, G, and B sub-pixels, and each of the second sub-pixel groups P102 includes four pixels arranged in a second-order array, such as B, G, G, and R sub-pixels. What calls for special attention is that: in this embodiment, each of the first pixel groups P101 and each of the second pixel groups P102 are sorted in an interlaced arrangement, wherein the four pixels of each of the first pixel groups P101 and the four pixels of each of the second pixel groups P102 are presented upside down and in reverse.

Please note that, as shown in FIG. 10(*b*), when displaying a stereo image, each pixel is divided into two sub-pixels in order to generate a first sub-pixel rendering as a left-eye image and a second sub-pixel rendering as a right-eye image. For example, each pixel located in each row only includes one sub-pixel. Therefore, in this embodiment, adjacent sub-pixels can be shared to form a RGB color mixer, such that each pixel located in each row can make a complementary color. Hence, the problem that a single row lacks certain color(s) can be solved.

Please refer to FIG. 11. FIG. 11 (including sub-diagrams FIG. 11(*a*) and FIG. 11(*b*)) is a diagram showing a pixel rendering 1100 by using a layout method of a sub-pixel rendering according to an eighth embodiment of the present invention. The architecture of the pixel rendering 1100 shown in FIG. 11 is similar to that of the pixel rendering 1000 shown in FIG. 10. The difference between them is that: in FIG. 10, the pixel rendering 1000 is divided into a first sub-pixel rendering corresponding to a left-eye image and a second sub-pixel rendering corresponding to a right-eye image with a row-interlaced arrangement; in FIG. 11, the pixel rendering 1100 is divided into a first sub-pixel rendering corresponding to a left-eye image and a second sub-pixel rendering corresponding to a right-eye image with a column-interlaced arrangement. Those skilled in the art can readily understand the arrangement rule of the pixel rendering 1100 based on the description of the pixel rendering 1000, and further description is omitted here for brevity.

Figure 12:
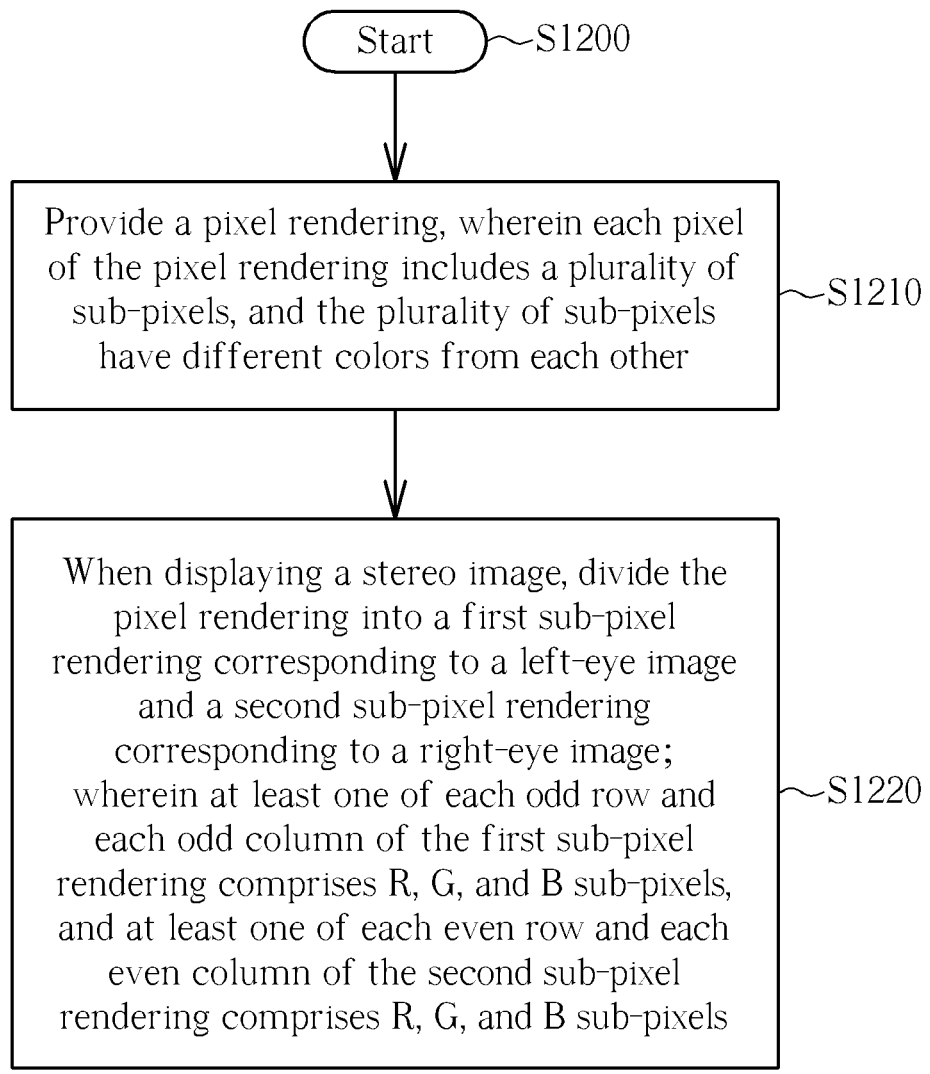
FIG. 12 is a flowchart illustrating a layout method of a sub-pixel rendering according to an exemplary embodiment of the present invention.

Please refer to FIG. 12, which is a flowchart illustrating a layout method of a sub-pixel rendering according to an exemplary embodiment of the present invention. The method includes, but is not limited to, the steps illustrated below. Please note that the following steps are not limited to be performed according to the exact sequence shown in FIG. 12 if a roughly identical result can be obtained.

Step S1200: Start;

Step S1210: Provide a pixel rendering, wherein each pixel of the pixel rendering includes a plurality of sub-pixels, and the plurality of sub-pixels have different colors from each other; and Step S1220: When displaying a stereo image, divide the pixel rendering into a first sub-pixel rendering corresponding to a left-eye image and a second sub-pixel rendering corresponding to a right-eye image; wherein at least one of each odd row and each odd column of the first sub-pixel rendering comprises R, G, and B sub-pixels, and at least one of each even row and each even column of the second sub-pixel rendering comprises R, G, and B sub-pixels.

Figure 13:
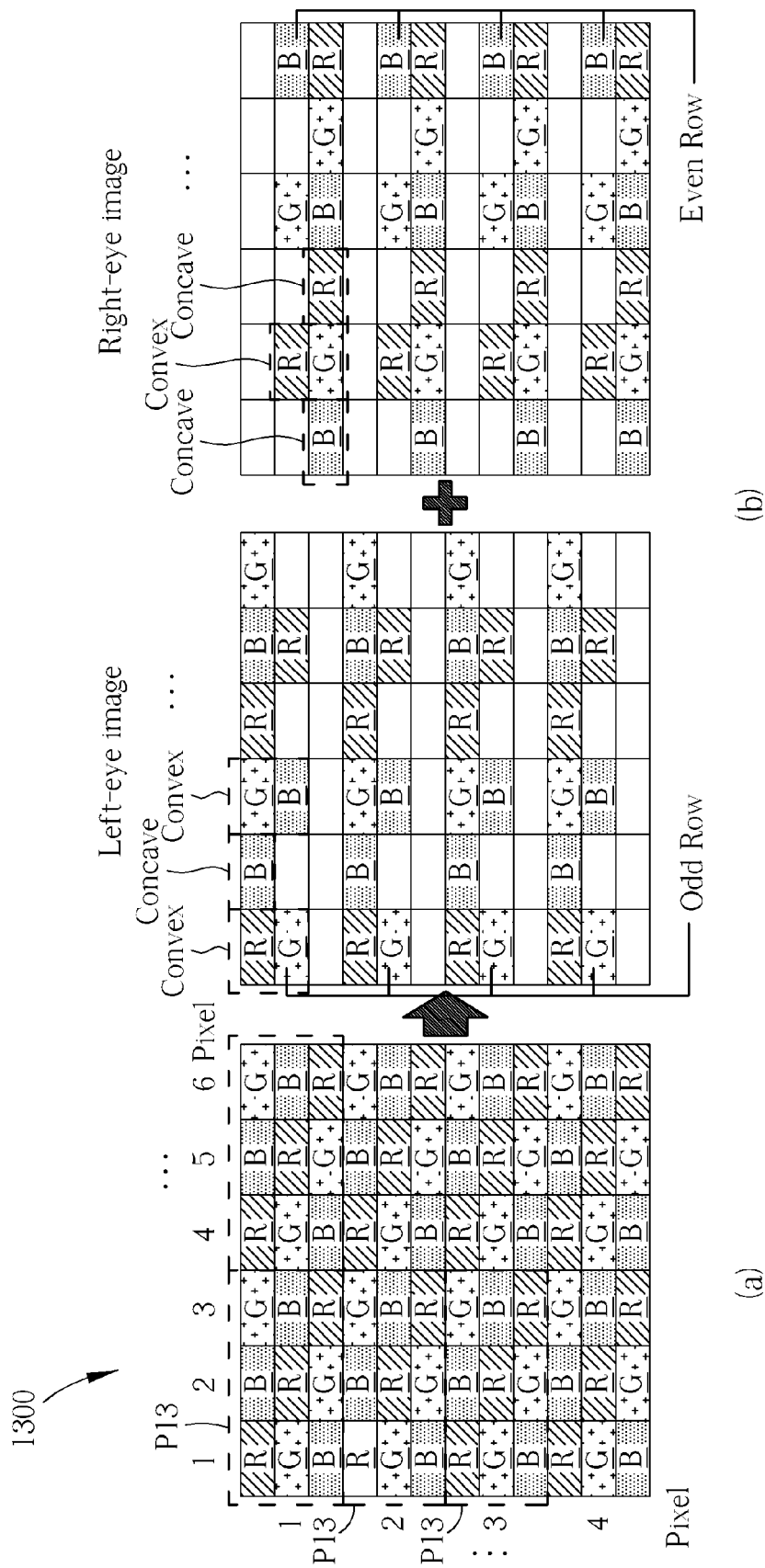
FIG. 13 (including sub-diagrams FIG. 13(a) and FIG. 13(b)) is a diagram showing a pixel rendering by using a layout method of a sub-pixel rendering according to a ninth embodiment of the present invention.

In the following paragraphs, the embodiments of FIG. 13 to FIG. 16 are used for illustrating the layout method of a sub-pixel rendering shown in FIG. 12. Please refer to FIG. 13, which is a diagram showing a pixel rendering by using a layout method of a sub-pixel rendering according to a ninth embodiment of the present invention. FIG. 13 includes sub-diagrams FIG. 13(a) and FIG. 13(b). As shown in FIG. 13(a), each pixel of the pixel rendering 1300 located in each row includes R, G, and B sub-pixels which have different colors from each other. In addition, the pixel rendering 1300 includes a plurality of sub-pixel groups P13, wherein each of the sub-pixel groups P13 includes nine sub-pixels arranged in a third-order array, each row of the third-order array includes R, G, and B sub-pixels, and each column of the third-order array includes R, G and B sub-pixels.

As shown in FIG. 13(b), when displaying a stereo image, each pixel is divided into three sub-pixels in order to generate a first sub-pixel rendering as a left-eye image and a second sub-pixel rendering as a right-eye image. It should be noted that: every two adjacent rows of the first sub-pixel rendering and the second sub-pixel rendering are in a concave-convex interlaced arrangement; wherein the convex comprises two sub-pixels of each pixel and the concave comprises one sub-pixel of each pixel different from the sub-pixels of the convex. In addition, each odd row of the first sub-pixel rendering includes R, G, and B sub-pixels, and each even row of the second sub-pixel rendering includes R, G, and B sub-pixels. For example, each adjacent concave and convex includes R, G, and B sub-pixels, and thus the problem that a single row lacks certain color(s) meaning a white light is unable to be mixed can be solved.

Figure 14:
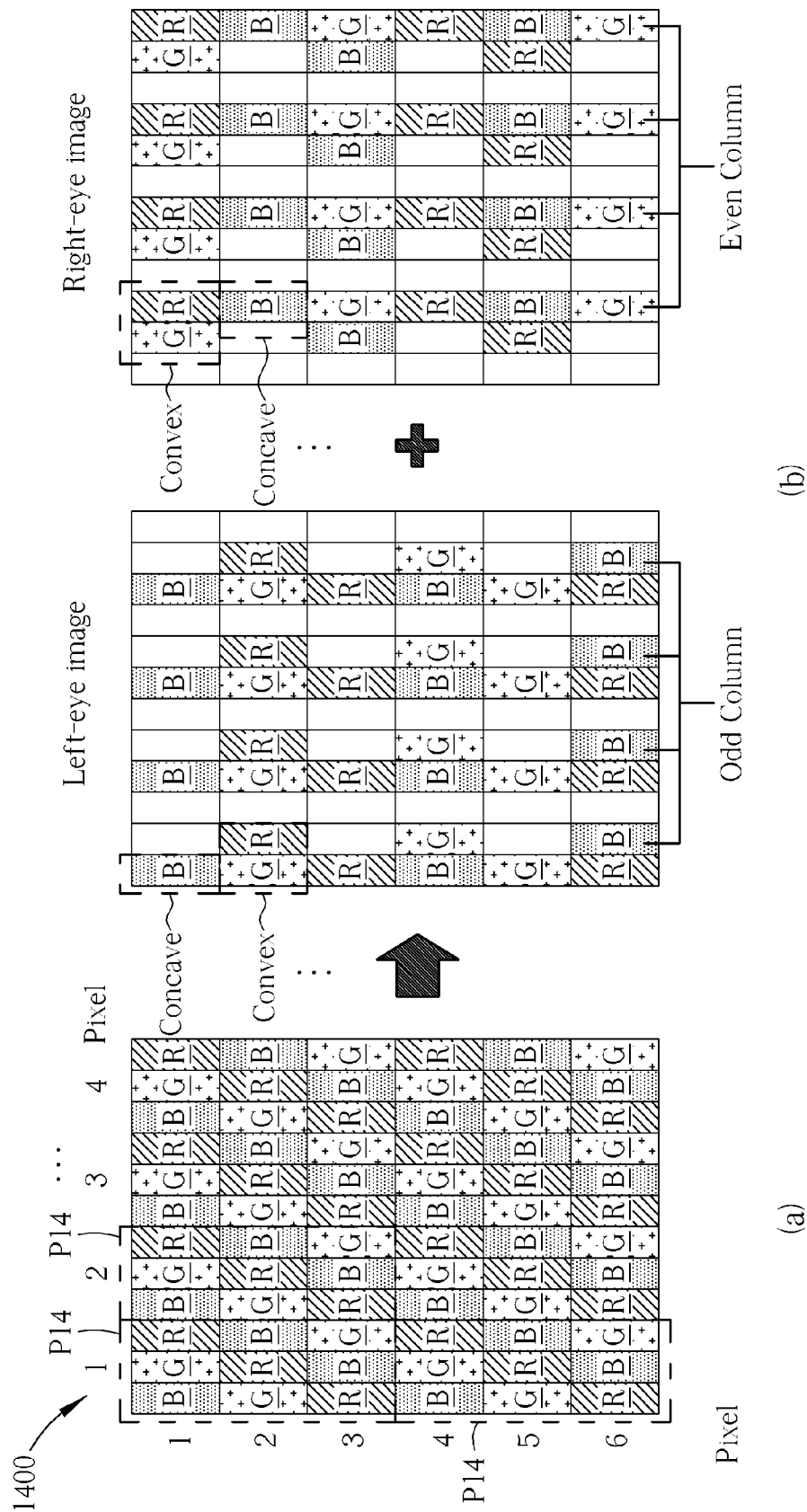
FIG. 14 (including sub-diagrams FIG. 14(a) and FIG. 14(b)) is a diagram showing a pixel rendering by using a layout method of a sub-pixel rendering according to a tenth embodiment of the present invention.

Please refer to FIG. 14. FIG. 14 (including sub-diagrams FIG. 14(a) and FIG. 14(b)) is a diagram showing a pixel rendering 1400 by using a layout method of a sub-pixel rendering according to a tenth embodiment of the present invention. The architecture of the pixel rendering 1400 shown in FIG. 14 is similar to that of the pixel rendering 1300 shown in FIG. 13. The difference between them is that: in FIG. 13, the pixel rendering 1300 is divided into a first sub-pixel rendering corresponding to a left-eye image and a second sub-pixel rendering corresponding to a right-eye image with a row-interlaced arrangement; in FIG. 14, the pixel rendering 1400 is divided into a first sub-pixel rendering corresponding to a left-eye image and a second sub-pixel rendering corresponding to a right-eye image with a column-interlaced arrangement. Those skilled in the art can readily understand the arrangement rule of the pixel rendering 1400 based on the description of the pixel rendering 1300, and further description is omitted here for brevity.

Figure 15:
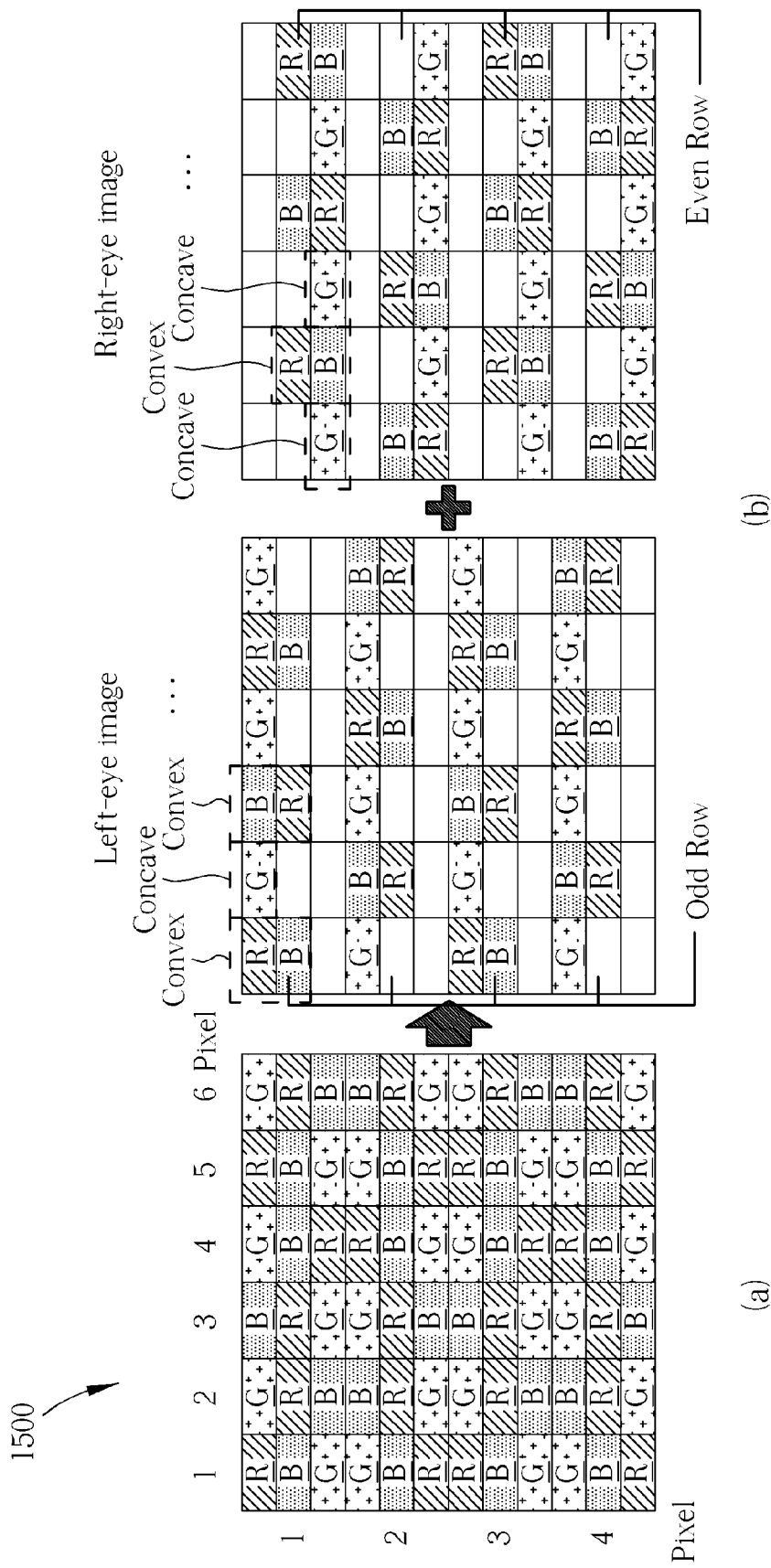
FIG. 15 (including sub-diagrams FIG. 15(a) and FIG. 15(b)) is a diagram showing a pixel rendering by using a layout method of a sub-pixel rendering according to an eleventh embodiment of the present invention.

Please refer to FIG. 15, which is a diagram showing a pixel rendering 1500 by using a layout method of a sub-pixel rendering according to an eleventh embodiment of the present invention. FIG. 15 includes sub-diagrams FIG. 15(a) and FIG. 15(b). As shown in FIG. 15(a), each pixel of the pixel rendering 1500 located in each row includes R, G, and B sub-pixels. As shown in FIG. 15(b), when displaying a stereo image, three sub-pixels of each pixel are used for generating the first sub-pixel rendering and the second sub-pixel rendering, respectively. It should be noted that: every two adjacent rows of the first sub-pixel rendering and the second sub-pixel rendering are in a concave-convex interlaced arrangement; wherein the convex comprises R and B sub-pixels of each pixel and the concave comprises G sub-pixel of each pixel. Therefore, each odd row of the first sub-pixel rendering includes R, G, and B sub-pixels, and each even row of the second sub-pixel rendering includes R, G, and B sub-pixels. For example, each adjacent concave includes R, G, and B sub-pixels and each adjacent convex includes R, G, and B sub-pixels.

Therefore, in this embodiment, the problem that a single row lacks certain color(s) meaning a white light is unable to be mixed can be solved. In addition, by using the G sub-pixel of the concave to complement the brightness of screens, the brightness of the panel can become more uniform in order to improve image quality.

Figure 16:
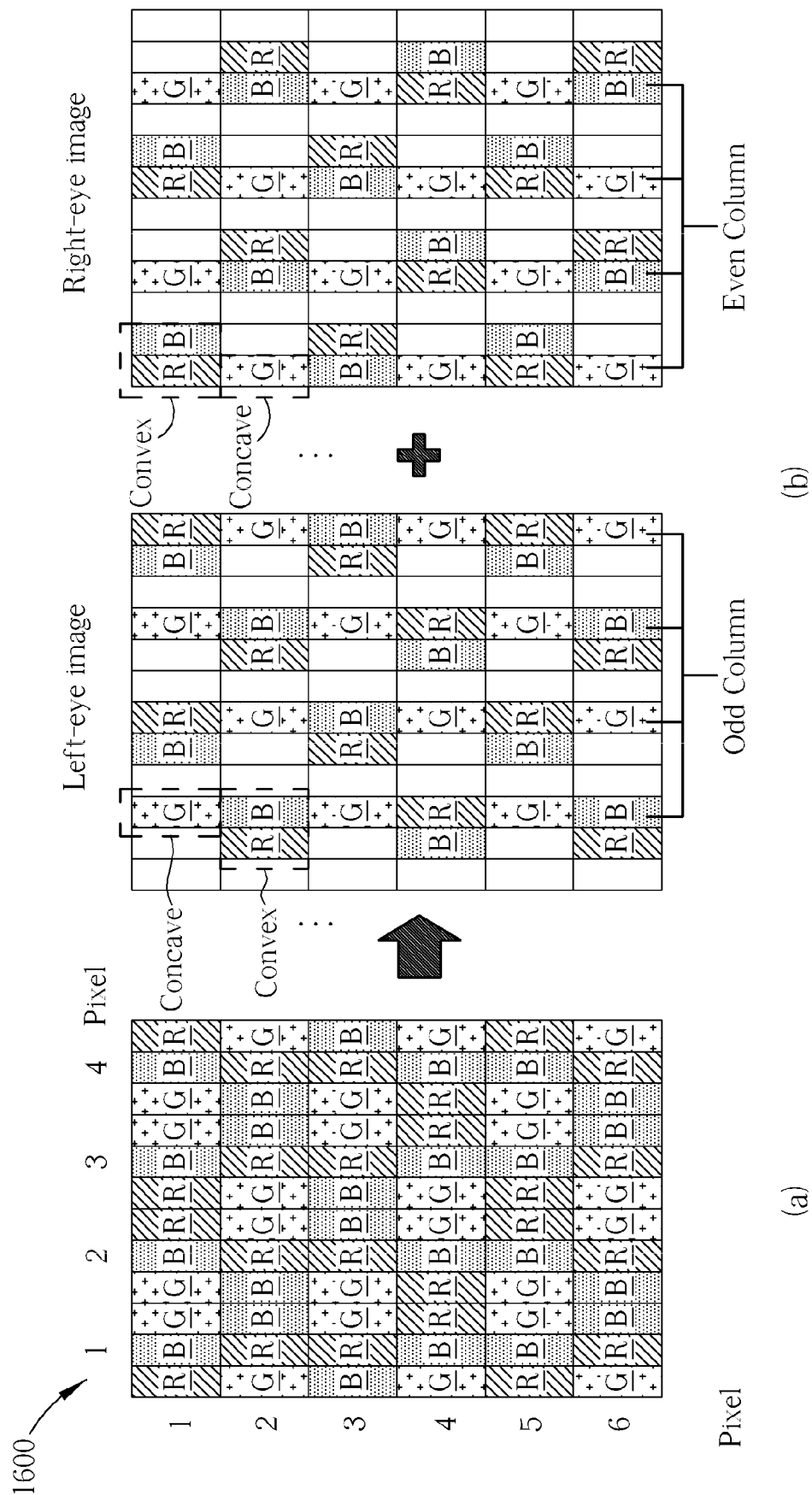
FIG. 16 (including sub-diagrams FIG. 16(a) and FIG. 16(b)) is a diagram showing a pixel rendering by using a layout method of a sub-pixel rendering according to a twelfth embodiment of the present invention.

Please refer to FIG. 16. FIG. 16 (including sub-diagrams FIG. 16(a) and FIG. 16(b)) is a diagram showing a pixel rendering 1600 by using a layout method of a sub-pixel rendering according to a twelfth embodiment of the present invention. The architecture of the pixel rendering 1600 shown in FIG. 16 is similar to that of the pixel rendering 1500 shown in FIG. 15. The difference between them is that: in FIG. 15, the pixel rendering 1500 is divided into a first sub-pixel rendering corresponding to a left-eye image and a second sub-pixel rendering corresponding to a right-eye image with a row-interlaced arrangement; in FIG. 16, the pixel rendering 1600 is divided into a first sub-pixel rendering corresponding to a left-eye image and a second sub-pixel rendering corresponding to a right-eye image with a column-interlaced arrangement. Those skilled in the art can readily understand the arrangement rule of the pixel rendering 1600 based on the description of the pixel rendering 1500, and further description is omitted here for brevity.

Please note that the abovementioned layout methods of sub-pixel rendering may be applied to OLED panels, but the present invention is not limited to this only.

The abovementioned embodiments are merely practicable embodiments of the present invention, and in no way should be considered to be limitations of the scope of the present disclosure.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A layout method of sub-pixel rendering, comprising:
providing a pixel rendering, wherein each pixel of the pixel rendering includes a plurality of sub-pixels, and the plurality of sub-pixels have different colors from each other; and
when displaying a stereo image with a row-interlaced arrangement, dividing the pixel rendering into a first sub-pixel rendering corresponding to a left-eye image and a second sub-pixel rendering corresponding to a right-eye image;
wherein each row of the first sub-pixel rendering comprises R, G, and B sub-pixels, and each row of the second sub-pixel rendering comprises R, G, and B sub-pixels, wherein a width of at least one of the first sub-pixel rendering and the second sub-pixel rendering with respect to a vertical direction is identical to a width of a single sub-pixel with respect to the vertical direction.

2. The method according to claim 1, wherein the pixel rendering comprises:
a plurality of first sub-pixel groups, wherein each row each of the first sub-pixel groups comprises an R sub-pixel and a G sub-pixel; and
a plurality of second sub-pixel groups, wherein each row of each of the second sub-pixel groups comprises a B sub-pixel and a G sub-pixel;
wherein for each pixel of the pixel rendering located in each row, the first sub-pixel group comprising the R-sub-pixel and the G sub-pixel and the second sub-pixel group comprising the B-sub pixel and the G sub-pixel are in an interlaced arrangement.

3. The method according to claim 2, wherein when displaying the stereo image, each pixel is divided into four sub-pixels in order to form the first sub-pixel group and the second sub-pixel group, respectively.

4. The method according to claim 1, wherein the pixel rendering comprises:
a plurality of first sub-pixel groups, wherein each row of each of the first sub-pixel groups sequentially comprises R, G, B, R, G, and B sub-pixels; and
a plurality of second sub-pixel groups, wherein each row of each of the second sub-pixel groups sequentially comprises B, G, R, B, G, and R sub-pixels;
wherein for each pixel of the pixel rendering located in each row, the first sub-pixel group sequentially comprising the R, G, B, R, G, and B sub-pixels and the second sub-pixel group sequentially comprising the B, G, R, B, G, and R sub-pixels are in an interlaced arrangement.

5. The method according to claim 4, wherein when displaying the stereo image, each pixel is divided into four sub-pixels in order to form the first sub-pixel group and the second sub-pixel group, respectively.

6. The method according to claim 1, wherein each pixel of the pixel rendering located in each row comprises two sub-pixels, and the pixel rendering comprises:
a plurality of sub-pixel groups, wherein each of the sub-pixel groups comprises nine sub-pixels arranged in a third-order array, each row of the third-order array comprises R, G, and B sub-pixels, and each column of the third-order array comprises R, G and B sub-pixels.

7. The method according to claim 6, wherein when displaying the stereo image, each pixel is divided into two sub-pixels in order to form the plurality of sub-pixel groups, respectively.

8. A layout method of sub-pixel rendering, comprising:
providing a pixel rendering, wherein each pixel rendering comprises:
a plurality of first pixel groups, wherein each one of the plurality of first pixel groups comprises four pixels arranged in a second-order array; and
a plurality of second pixel groups, wherein each one of the plurality of second pixel groups comprises four pixels arranged in a second-order array; and
sorting each of the first pixel groups and each of the second pixel groups in an interlaced arrangement, wherein the four pixels of each of the first pixel groups and the four pixels of each of the second pixel groups are presented upside down and in reverse.

9. The method according to claim 8, wherein the four pixels of each of the first pixel groups comprises R, G, G, and B pixels; and the four pixels of each of the second pixel groups comprises B, G, G, and R pixels.

10. The method according to claim 9, wherein when displaying a stereo image, each pixel is divided into two sub-pixels in order to form the first sub-pixel group and the second sub-pixel group, respectively.

11. A layout method of sub-pixel rendering, comprising:
providing a pixel rendering, wherein each pixel of the pixel rendering includes a plurality of sub-pixels, and the plurality of sub-pixels have different colors from each other; and
when displaying a stereo image with a column-interlaced arrangement, dividing the pixel rendering into a first sub-pixel rendering corresponding to a left-eye image and a second sub-pixel rendering corresponding to a right-eye image;
wherein each odd column of the first sub-pixel rendering comprises R, G, and B sub-pixels, and each even column of the second sub-pixel rendering comprises R, G, and B sub-pixels, and a width of at least one of the first sub-pixel rendering and a second sub-pixel rendering with respect to a horizontal direction is different in different sub-pixel locations.

12. The method according to claim 11, wherein each pixel of the pixel rendering located in each column comprises R, G, and B sub-pixels, and the pixel rendering comprises:
a plurality of sub-pixel groups, wherein each of the sub-pixel groups comprises nine sub-pixels arranged in a third-order array, each row of the third-order array comprises R, G, and B sub-pixels, and each column of the third-order array comprises R, G, and B sub-pixels.

13. The method according to claim 12, wherein when displaying the stereo image, three sub-pixels of each pixel are used for forming the first sub-pixel rendering and the second sub-pixel rendering, respectively; wherein every two adjacent columns of the first sub-pixel rendering and the second sub-pixel rendering are in a concave-convex interlaced arrangement; the convex comprises two sub-pixels of each pixel and the concave comprises one sub-pixel of each pixel different from the sub-pixels of the convex.

14. The method according to claim 11, wherein each pixel of the pixel rendering located in each column comprises three sub-pixels; and when displaying the stereo image, the three sub-pixels of each pixel are used for forming the first sub-pixel rendering and the second sub-pixel rendering, respectively; every two adjacent columns of the first sub-pixel rendering and the second bus-pixel rendering are in a concave-convex interlaced arrangement; and the convex comprises a R sub-pixel and a B sub-pixel of each pixel and the concave comprises a G sub-pixel of each pixel.

15. The method according to claim 14, wherein each pixel of the pixel rendering located in each column comprises R, G, and B sub-pixels.

* * * * *